United States Patent
Oya (10) Patent No.: US 10,691,956 B2
(45) Date of Patent: Jun. 23, 2020

(54) INFORMATION PROCESSING APPARATUS, INFORMATION PROCESSING SYSTEM, INFORMATION PROCESSING METHOD, AND STORAGE MEDIUM HAVING DETERMINATION AREAS CORRESPONDING TO WAITING LINE

(71) Applicant: CANON KABUSHIKI KAISHA, Tokyo (JP)

(72) Inventor: Takashi Oya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/971,824

(22) Filed: May 4, 2018

(65) Prior Publication Data

US 2018/0330170 A1  Nov. 15, 2018

(30) Foreign Application Priority Data

May 12, 2017  (JP) ................................. 2017-095759
Feb. 15, 2018  (JP) ................................. 2018-025099

(51) Int. Cl.
*H04N 7/18*  (2006.01)
*G06K 9/00*  (2006.01)
*G06T 7/292*  (2017.01)

(52) U.S. Cl.
CPC .......... *G06K 9/00778* (2013.01); *G06T 7/292* (2017.01); *H04N 7/181* (2013.01); *G06T 2207/30232* (2013.01)

(58) Field of Classification Search
CPC ................................................ G06K 9/00778

USPC .......................................................... 348/159
See application file for complete search history.

(56) References Cited

U.S. PATENT DOCUMENTS

| | | | | |
|---|---|---|---|---|
| 2006/0227862 | A1* | 10/2006 | Campbell | G06K 9/00778 375/240 |
| 2010/0177963 | A1* | 7/2010 | Yokomitsu | B61L 23/00 382/170 |
| 2010/0322516 | A1* | 12/2010 | Xu | G06K 9/00778 382/173 |
| 2011/0007944 | A1* | 1/2011 | Atrazhev | G06K 9/00778 382/103 |
| 2014/0012539 | A1* | 1/2014 | Takaoka | H04W 4/027 702/160 |
| 2015/0120237 | A1* | 4/2015 | Gouda | G06T 7/215 702/150 |
| 2016/0267330 | A1* | 9/2016 | Oami | G06K 9/00778 |
| 2017/0061644 | A1* | 3/2017 | Pham | G06K 9/00 |

FOREIGN PATENT DOCUMENTS

JP  2005-216217 A  8/2005

\* cited by examiner

*Primary Examiner* — Leron Beck
(74) *Attorney, Agent, or Firm* — Canon U.S.A., Inc. IP Division

(57) ABSTRACT

An aspect of the present disclosure provides a detection unit that detects an object in determination areas of an image, a decision unit that decides whether each of the determination areas is in a congestion state based on the number of objects detected in the determination areas, and a determination unit that determines that a second determination area is in a line state when a first determination area is decided to be in the congestion state and the second determination area adjacent to the first determination area is decided to be in the congestion state.

13 Claims, 12 Drawing Sheets

INFORMATION PROCESSING APPARATUS, INFORMATION PROCESSING SYSTEM, INFORMATION PROCESSING METHOD, AND STORAGE MEDIUM HAVING DETERMINATION AREAS CORRESPONDING TO WAITING LINE

BACKGROUND

Field of the Invention

The present disclosure relates to a technique for estimating the number of people waiting in line.

Description of the Related Art

A waiting line of users is formed at an airport security check, a station ticketing counter, a bank automatic teller machine, and a shop cash register counter. Japanese Patent Laid-Open No. 2005-216217 discusses a technique for estimating the number of people waiting in line by detecting a waiting line from an image captured by a monitoring camera based on a background subtraction.

Figure 1A:
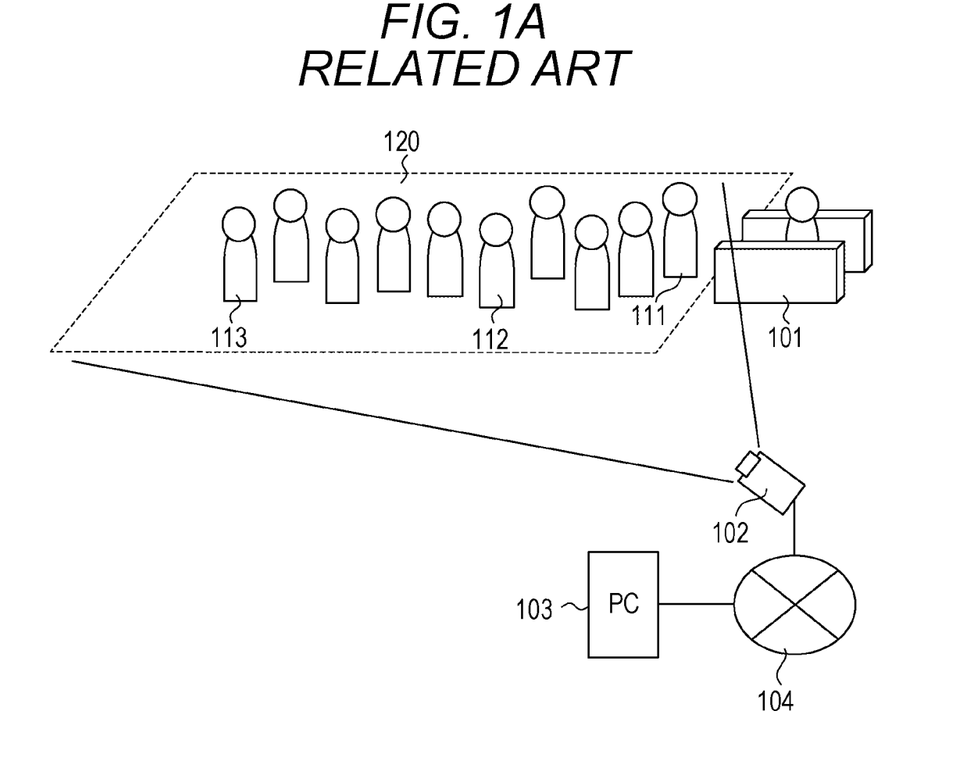
FIGS. 1A and 1B are diagrams each illustrating a line analysis system.
Figure 1B:
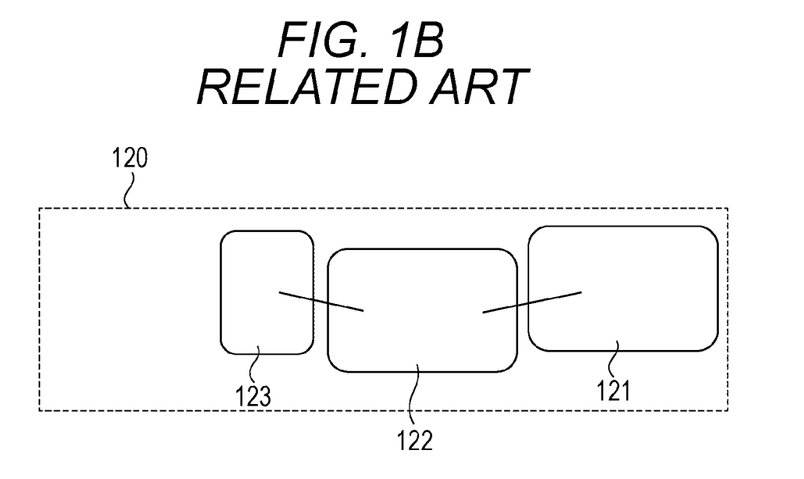

FIGS. 1A and 1B are diagrams each illustrating a line analysis system. In an information processing system illustrated in FIG. 1A, a camera 102 and a personal computer (PC) 103 are communicably connected to a network 104. The camera 102 observes an actual area 120, such as an entrance gate 101, within a visual field. In the actual area 120, a plurality of human figures including human FIGS. 111, 112, and 113 is waiting in line, and the line moves from left to right. FIG. 1B illustrates a line length determination method based on a background subtraction. An area 120 is an area on an image corresponding to the actual area 120. The PC 103 applies the background subtraction to the area 120. Then, the subtraction result is detected as a plurality of partial areas 121, 122, and 123. Next, the PC 103 connects the partial areas. As a result, a left end of the partial area 123 is determined to be a line end. The PC 103 connects the partial areas based on, for example, a shortest distance between area boundaries. To eliminate noise, the PC 103 selects connection candidate areas with an area greater than or equal to a predetermined value as the partial areas 121, 122, and 123.

SUMMARY OF THE INVENTION

According to an aspect of the present disclosure, an information processing apparatus includes a detection unit configured to detect an object in a plurality of determination areas, a decision unit configured to decide whether each of the plurality of determination areas is in a congestion state based on a number of detected objects, and a determination unit configured to determine that a first determination area and a second determination area are in a line state when the first determination area is decided to be in the congestion state and the second determination area adjacent to the first determination area is decided to be in the congestion state.

Further features will become apparent from the following description of exemplary embodiments with reference to the attached drawings.

DESCRIPTION OF THE EMBODIMENTS

First Exemplary Embodiment

In a first exemplary embodiment, a personal computer (PC) 203 divides an area in which a line is formed into a plurality of areas and designates an area in advance. The PC 203 counts the number of human figures detected in the designated area, thereby determining whether the line is extended to a specific area.

Figure 2:
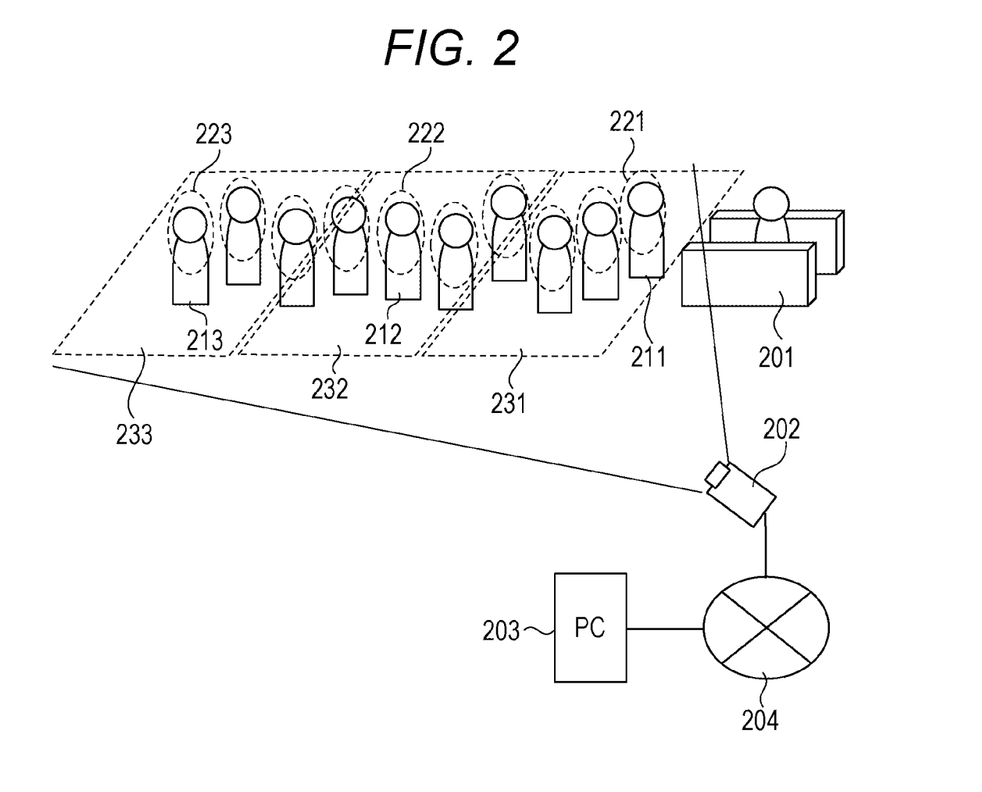
FIG. 2 is a diagram illustrating an example of a system configuration of an information processing system.

FIG. 2 is a diagram illustrating an example of a system configuration of an information processing system. The system configuration of the information processing system illustrated in FIG. 2 is similar to that of the information processing system illustrated in FIG. 1A. The area in which the line is formed is divided into a plurality of areas (actual areas 231, 232, and 233). The PC 203 detects human figures in each area. In the present exemplary embodiment, a human figure detection technique is used to detect human figures, and human figure detection results 221, 222, and 223 are obtained. The PC 203 counts the number of people in each area, and determines whether the line is extended to a specific area based on the determination result. In the example of FIG. 2, the line is extended in a direction toward the actual areas 231, 232, and 233.

Figure 3:
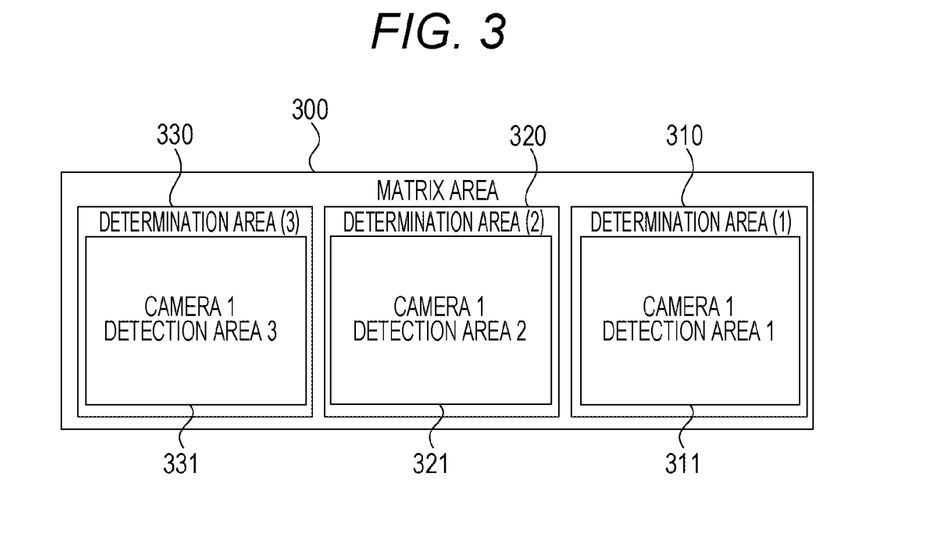
FIG. 3 is a diagram (No. 1) illustrating an area definition.

FIG. 3 is a diagram illustrating an area definition. A line area 300 is an area defined on an image captured by the camera 202 and includes a plurality of partial areas 310, 320, and 330. The partial areas 310, 320, and 330 correspond to the actual areas 231, 232, and 233, respectively. The result of counting the number of people in each partial area is used for determination. For this reason, these partial areas are hereinafter referred to as determination areas. Each determination area corresponds to a detection area set on the image. The detection area includes camera connection information and polygonal area coordinate information as setting values. In the example of FIG. 3, the determination area 310 corresponds to a detection area 311. Similarly, the determination area 320 corresponds to a detection area 321, and the determination area 330 corresponds to a detection area 331. The PC 203 defines the line area in the image as a set of a plurality of determination areas, and detects that the line is extended to a specific determination area by using a count of number of people in the determination area.

Figure 4:
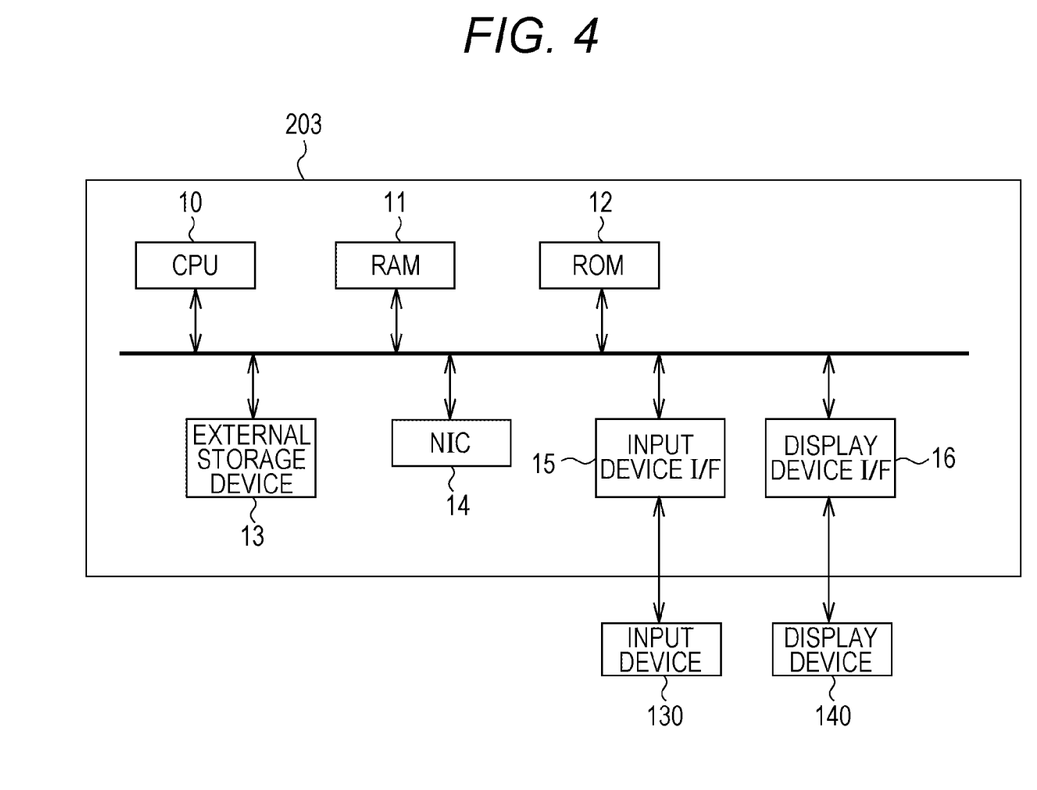
FIG. 4 is a diagram illustrating an example of a hardware configuration of a personal computer (PC).

FIG. 4 is a diagram illustrating an example of a hardware configuration of the PC 203. The PC 203 includes various units 10 to 16. The central processing unit (CPU) 10 is a unit that executes various programs to implement various functions. The random access memory (RAM) 11 is a unit that stores various information. The RAM 11 is also used as a temporary work memory area for the CPU 10. The read only memory (ROM) 12 is a unit that stores various programs and the like. For example, the CPU 10 loads the programs stored in the ROM 12 into the RAM 11 to execute the programs.

Figure 5:
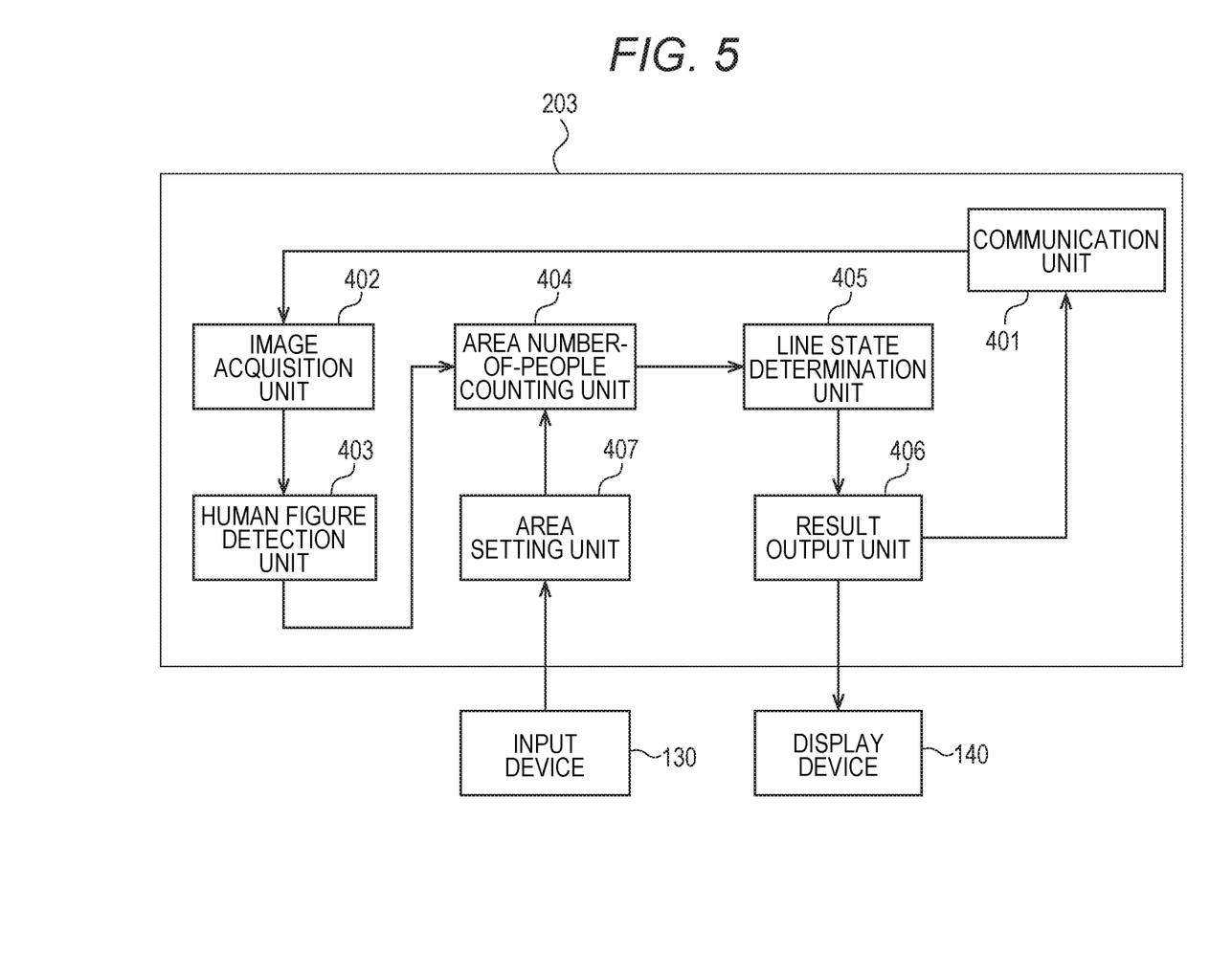
FIG. 5 is a diagram illustrating an example of a software configuration of the PC.
Figure 10A:
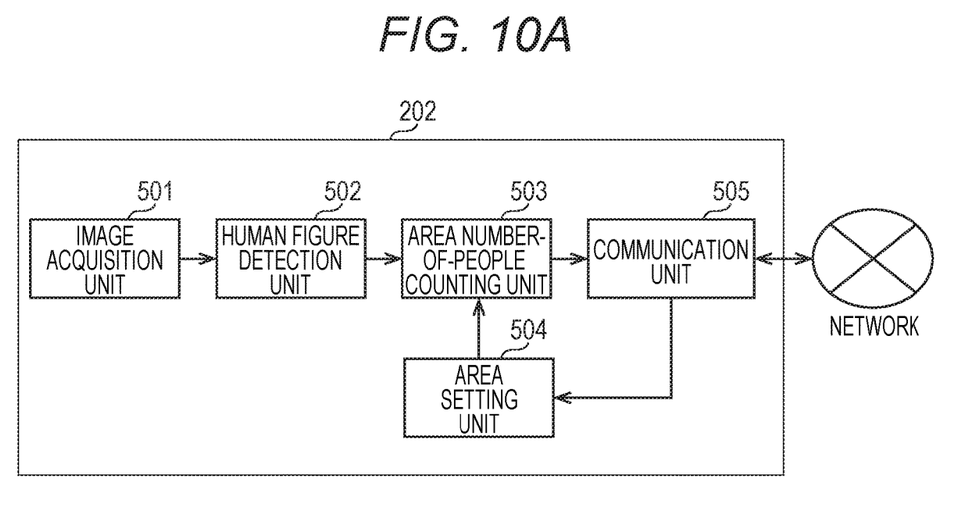
FIGS. 10A and 10B are diagrams each illustrating a software configuration according to the third exemplary embodiment.
Figure 10B:
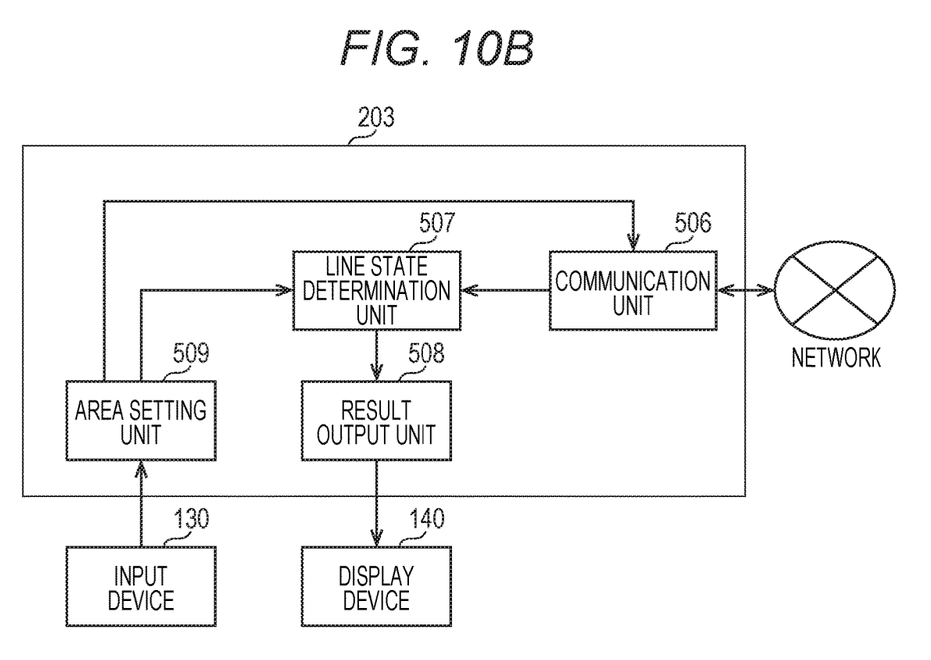

The CPU 10 executes processing based on the programs stored in the external storage device 13, such as a flash memory, a hard disk drive (HDD), or a solid state disk (SSD), thereby implementing the software configuration of the PC 203 as illustrated in FIGS. 5 and 10B and processing of each step in the flowcharts illustrated in FIGS. 6A, 6B, 8, and 11B.

The entire or a part of the software configuration of the PC 203 as illustrated in FIGS. 5 and 10B and the processing of each step in the flowcharts of FIGS. 6A, 6B, 8, and 11B can be implemented using dedicated hardware.

A network interface card (NIC) 205 is a unit that connects the PC 203 to the network.

An input device interface (I/F) 15 is an interface that connects the PC 203 to an input device 130, such as a mouse or a keyboard.

A display device I/F 16 is an interface that connects the PC 203 to a display device 140, such as a display.

The PC 203 can be implemented by one apparatus or computer as illustrated in FIG. 4, or can be implemented by a plurality of apparatuses or computers.

FIG. 5 is a diagram illustrating an example of the software configuration of the PC 203.

The PC 203 includes, as the software configuration, a communication unit 401, an image acquisition unit 402, a human figure detection unit 403, an area number-of-people count unit 404, a line state determination unit 405, a result output unit 406, and an area setting unit 407.

The image acquisition unit 402 acquires an image captured by the camera 202. The acquired image is not dependent on a specific image format or compression method.

The human figure detection unit 403 detects the position and direction of each human figure in the acquired image. The detection processing performed by the human figure detection unit 403 is not dependent on a specific human figure detection method. For example, the human figure detection unit 403 detects human figures by using a method of detecting a silhouette shape of an upper body, a face detection method, a method of detecting a human figure by learning other feature amounts, or the like.

The area number-of-people count unit 404 detects the number of human figures present in the determination areas 310, 320, and 330 by using a parameter or the like for detecting a human figure, and counts the number of human figures based on the detection result. The area setting unit 407 sets the determination areas as illustrated in FIG. 3 based on an input operation or the like through an input device 410.

The line state determination unit 405 determines whether each of the determination areas is in a congestion state based on the result of counting the human figures in each determination area, and determines whether the determination area to be processed is in a line state based on whether the adjacent determination area is in the congestion state.

The result output unit 406 outputs the result of determination made by the line state determination unit 405. The result output unit 406 outputs the determination result as a file, outputs the determination result on a display, or transmits and outputs the determination result to another apparatus or the like.

Figure 6A:
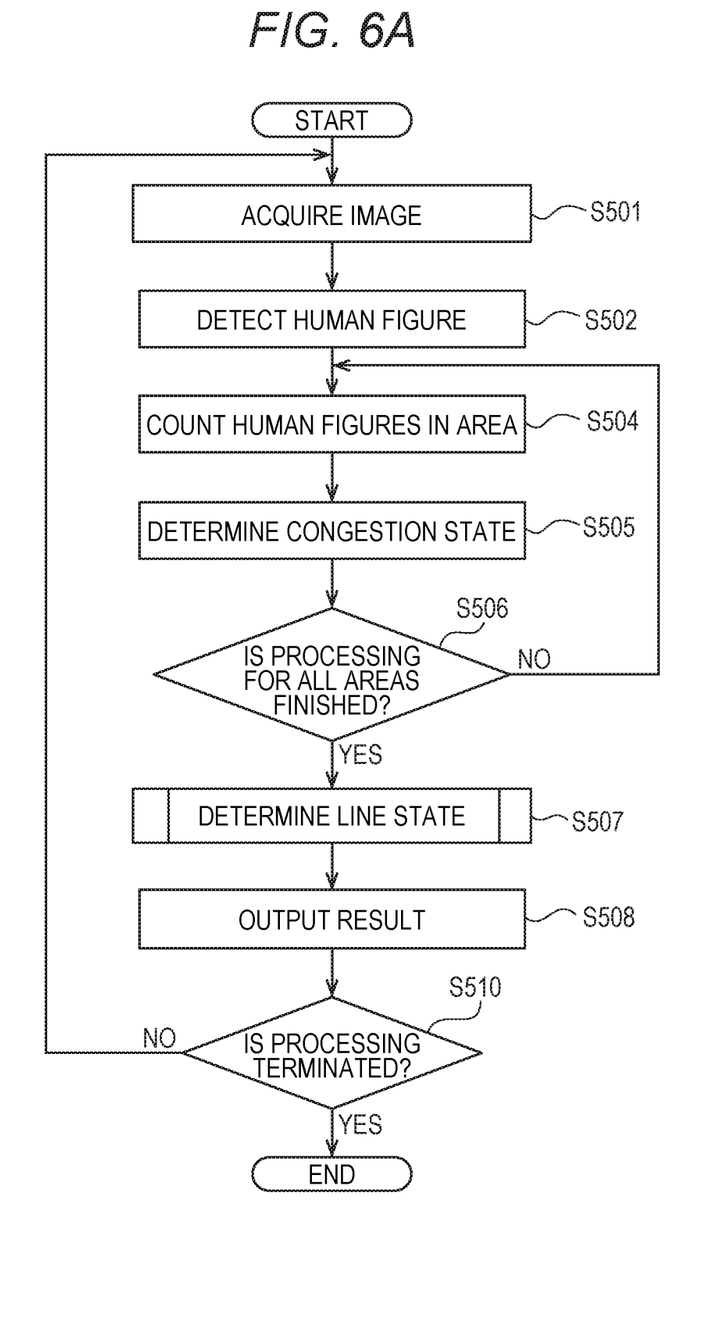
FIGS. 6A and 6B are flowcharts each illustrating an example of information processing according to a first exemplary embodiment.
Figure 6B:
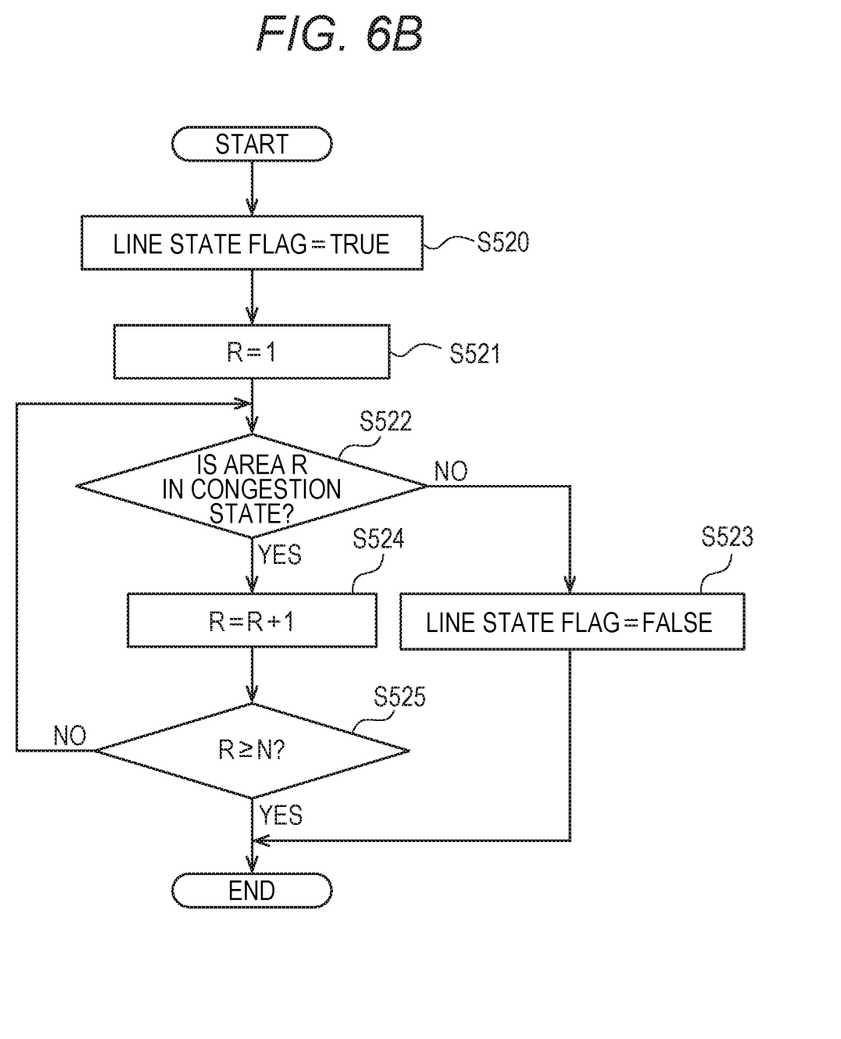

FIGS. 6A and 6B are flowcharts each illustrating information processing. FIG. 6A illustrates main processing and FIG. 6B illustrates detailed processing of S507.

In S501, the image acquisition unit 402 acquires an image.

In S502, the human figure detection unit 403 detects a human figure from a determination area to be processed on the acquired image.

In S504, the area number-of-people count unit 404 counts the number of human figures detected in the determination area to be processed.

In S505, the line state determination unit 405 determines the congestion state of the determination area. For example, the CPU 10 sets a threshold for the number of human figures for each determination area in advance based on an input operation through the input device 130 or the like, and sets the threshold as a file or the like in the RAM 11, ROM 12, the external storage device 13, or the like. The line state determination unit 405 acquires, as a file or the like, the threshold for the number of human figures in the determination area to be processed. When the number of human figures detected from the determination area to be processed reaches the acquired threshold, the line state determination unit 405 determines that the determination area to be processed is in the congestion state. The processing of S505 is an example of decision processing.

In S506, the line state determination unit 405 determines whether the processing on all determination areas is terminated. If the line state determination unit 405 determines that the processing on all determination areas is terminated (YES in S506), the processing proceeds to S507. If the line state determination unit 405 determines that the processing on all determination areas is not terminated (NO in S506), the processing returns to S504.

In S507, the line state determination unit 405 determines whether a specific determination area is in the line state based on the determination area that is determined to be in the congestion state. For example, the line state determination unit 405 determines whether a specific determination area is in the line state based on whether the line is extended from a predetermined adjacent determination area. FIG. 6B illustrates detailed processing of S507.

In S508, the result output unit 406 outputs the result based on the determination result of S507. The result output unit 406 outputs the result as a file, outputs and displays the result, or transmits and outputs the result to another apparatus or the like.

In S510, the result output unit 406 determines whether the processing of the flowchart illustrated in FIG. 6A is terminated. If the result output unit 406 determines that the processing is terminated (YES in S510), the processing of the flowchart illustrated in FIG. 6A is terminated. If the result output unit 406 determines that the processing is not terminated (NO in S510), the processing returns to S501.

S520 to S525 illustrated in FIG. 6B indicate details of S507. S507 is processing that determines whether a specific determination area is in the line state. The area to be determined is represented by N.

In S520, the line state determination unit 405 sets a line state flag to "true".

In S521, the line state determination unit 405 sets an area variable R for the determination area to "1".

In S522, the line state determination unit 405 determines whether the area indicated by "R" is in the congestion state based on the determination result of S505. When the line state determination unit 405 determines that the area R is not in the congestion state (NO in S522), the processing proceeds to S523. If the line state determination unit 405 determines that the area R is in the congestion state (YES in S522), the processing proceeds to S524.

In S523, the line state determination unit 405 sets the line state flag to "false".

In S524, the line state determination unit 405 increases (increments) the value R by 1.

In S525, the line state determination unit 405 determines whether the determination up to the area N is completed. When the line state determination unit 405 determines that the determination up to the area N is completed (YES in S525), the processing of the flowchart illustrated in FIG. 6B is terminated. If the line state determination unit 405 determines that the determination up to the area N is not completed (NO in S525), the processing returns to S522.

The processing of FIG. 6B enables the determination whether the area N is in the line state.

The implementation of processing of S520 to S525 can be simplified when N represents a few areas. For example, when N=3, the implementation can be made using a logical expression that "when all areas 1, 2, and 3 are in the congestion state, the area 3 is in the line state".

In the determination of the congestion state in S505, the line state determination unit 405 can decide a threshold for the number of human figures based on which it is determined that an area is the congestion state, based on the statistic of the number of human figures detected in the determination area in a last period. For example, the line state determination unit 405 can decide the threshold by using the average value of the number of human figures detected in the determination area in the last period, and the value obtained by multiplying a predetermined constant by a mode.

Based on the above-described method, the CPU 10 arranges determination areas in a direction from the head of a line toward the end of the line and determines the congestion state of the line by using the result of detecting human figures. Next, the CPU 10 determines the line state of the determination area based on the congestion state of the line. Thus, the CPU 10 can make the determination based on an accurate count of human figures. As a result, the CPU 10 can effectively take measures, for example, by increasing the number of staff for guiding people when a line of people is extended to a predetermined position.

Modified Example 1

In a modified example of the above-described exemplary embodiment, the PC 203 includes a human figure tracking function in addition to the human figure detection function, and detects the moving speed of each human figure, in addition to the position of each human figure. It is estimated that the moving speed of such human figures is higher than that of human figures waiting in line. Accordingly, the PC 203 excludes human figures with a moving speed greater than or equal to a certain value from the target of counting the number of human figures in each determination area (determines whether each determination area is in the congestion state based on the number of objects with a moving speed less than a certain value). As processing, the PC 203 adds, after S502 illustrated in FIG. 6, human figure tracking processing in which human figures with a moving speed greater than or equal to a certain value are excluded from the target of counting the number of human figures. In the described processing, human figures that are actually waiting in line are detected and the detected human figures are used to determine the line state, which results in improvement of the determination accuracy.

Modified Example 2

Figure 7:
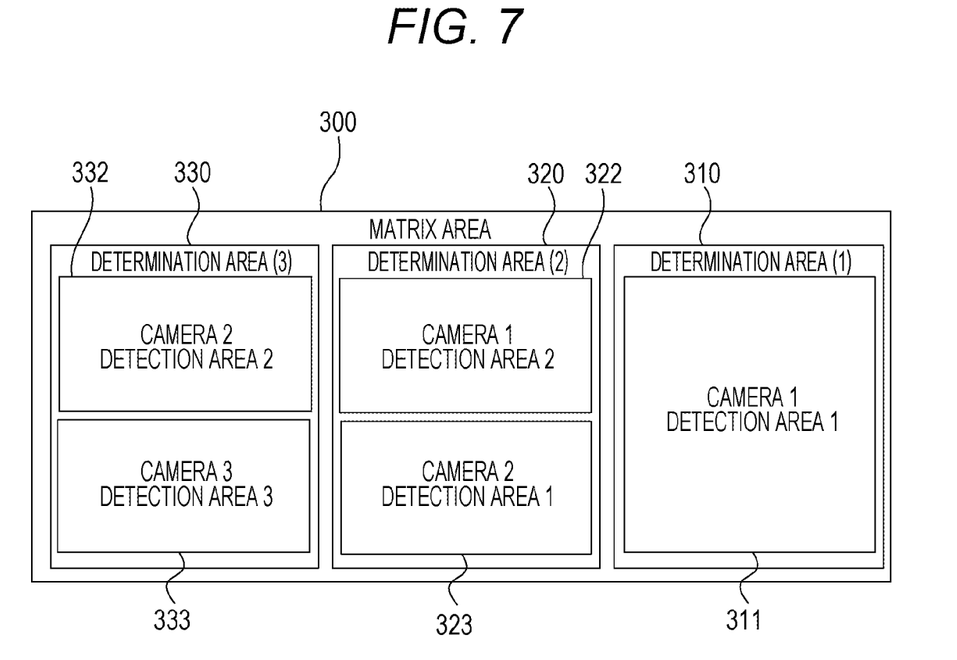
FIG. 7 is a diagram (No. 2) illustrating an area definition.

As another modified example of the above-described exemplary embodiment, a determination area for a line can be defined using a plurality of cameras. The area setting unit 407 sets determination areas as illustrated in FIG. 7 based on an input operation or the like through the input device 410. This is effective when the shape of a line is complex. For example, in FIG. 7, a determination area (2) 320 includes a detection area 2 (322) of a camera and a detection area 1 (323) of a camera 2. The detection area 2 (322) of the camera 1 is a partial area of an image captured by the camera 1. The detection area 1 (323) of the camera 2 is a partial area of an image captured by the camera 2. The count number of people in the determination area (2) 320 is the sum of the count number of people in the detection area 2 (322) and the count number of people in the detection area 1 (323). Similarly, the determination area (3) 330 includes the detection area 2 (332) of the camera 2 and a detection area (333) of a camera 3. The detection area 2 (332) of the camera 2 is a partial area of an image captured by the camera 2. The detection area 3 (333) of the camera 3 is a partial area of an image captured by the camera 3. The count number of people in the determination area (3) 330 is the sum of the count number of people in the detection area (333) and the count number of people in the detection area 2 (332).

The use of a plurality of cameras enables dealing with a case where a certain determination area cannot be set within the visual field of one camera, a case where some human figures are hidden when the shape of a line of people is complex, and the like. The use of a plurality of cameras is also effective when a line of people extends in depth and human figures cannot be detected depending on a position within a screen.

Second Exemplary Embodiment

As a second exemplary embodiment, the line state determination unit 405 can also determine a line end based on the determination of the line state. For example, the line state determination unit 405 confirms whether the determination area R is in the congestion state in order from the head area, and determines the area preceding the area that is not in the congestion state as an end area.

Figure 8:
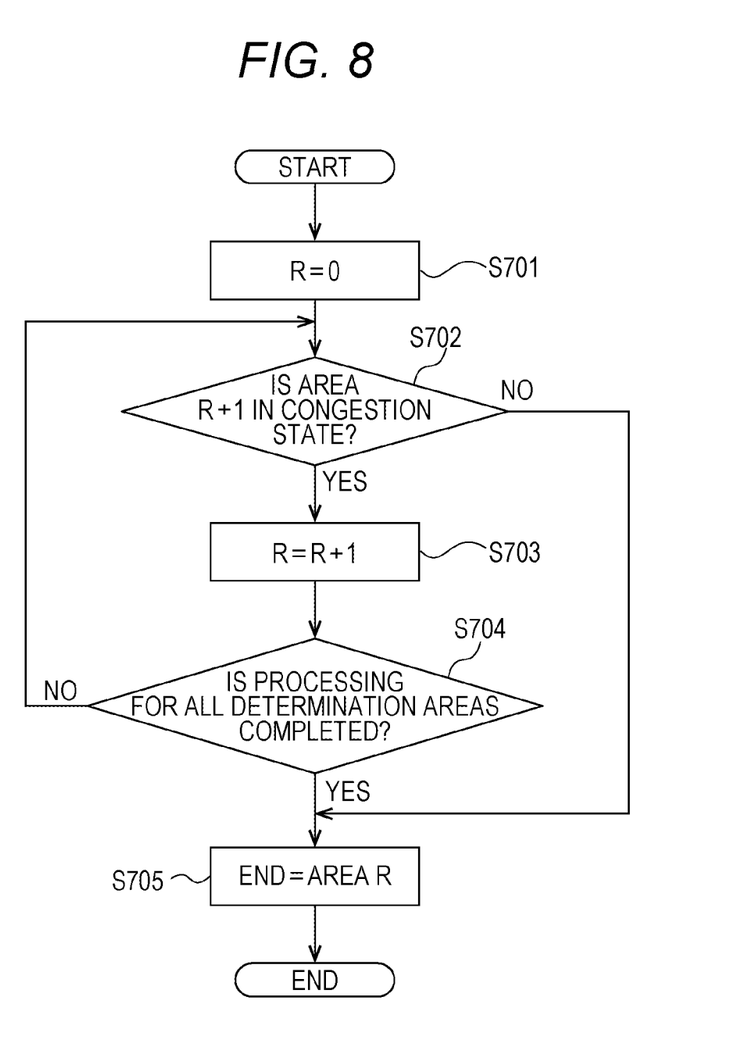
FIG. 8 is a flowchart illustrating an example of information processing according to a second exemplary embodiment.

In the processing according to the present exemplary embodiment, the line state determination processing (S520 to S525) of S507 illustrated in FIG. 6 is replaced by the processing illustrated in FIG. 8. R represents a variable indicating a determination area.

In S701, the line state determination unit 405 initializes R to 0.

In S702, the line state determination unit 405 determines whether a determination area R+1 is in the congestion state. If the line state determination unit 405 determines that the determination area R+1 is in the congestion state (YES in S702), the processing proceeds to S703. If the line state determination unit 405 determines that the determination area R+1 is not in the congestion state (NO in S702), the processing proceeds to S705.

In S703, the line state determination unit 405 increases (increments) the value R by 1.

In S704, the line state determination unit 405 determines whether the processing on all determination areas is completed. If the line state determination unit 405 determines that the processing on all determination areas is completed, i.e., if R=N (YES in S704), the processing proceeds to S705. If the line state determination unit 405 determines that the processing on all determination areas is not completed (NO in S704), the processing returns to S702.

In S705, the line state determination unit 405 determines the determination area R to be the end area.

As a result of the processing, when the end area is the determination area 0, the CPU 10 determines that there is no line. When the end area is the determination area N, which corresponds to the number of determination areas, the CPU 10 determines that the line is extended to a last area in a preliminarily set determination area group and the true end of the line is present in an area other than the set determination area. The CPU 10 can output the determination result, line information (e.g., information about the end determination area), and the like to the display device 140 or the like. The CPU 10 can carry out a predetermined action, such as issuance of a warning to the user, or notification via an email, when the end of the line reaches a predetermined position.

Third Exemplary Embodiment

In the exemplary embodiments described above, the PC 203 includes the functions to execute processing. A third exemplary embodiment illustrates an example in which the processing and the like performed by the PC 203 in the exemplary embodiments described above are performed by the PC 203 and the camera 202.

Figure 9:
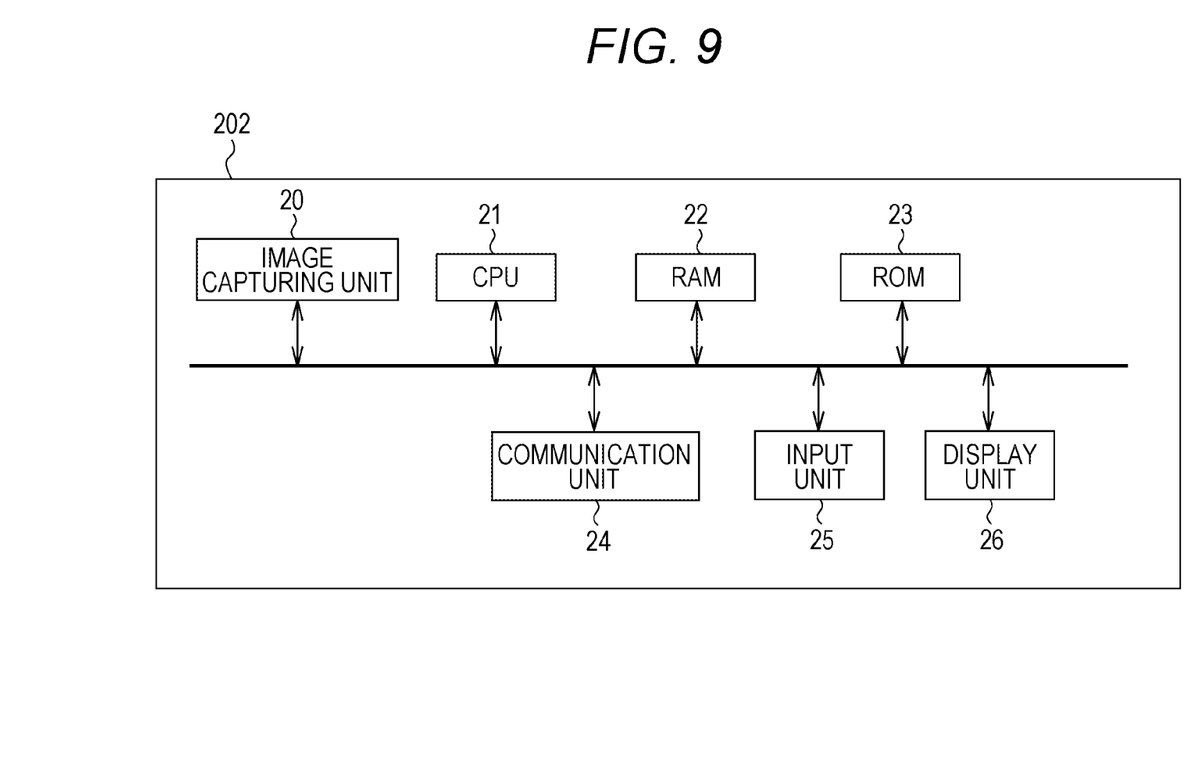
FIG. 9 is a diagram illustrating an example of a hardware configuration according to a third exemplary embodiment.

FIG. 9 is a diagram illustrating an example of the hardware configuration of the camera 202. The camera 202 includes various units 20 to 26. The image capturing unit 20 includes an optical system and a control device. The image capturing unit 20 controls the optical system based on a scene and captures an image. The CPU 21 is a unit that executes various programs to implement various functions. The RAM 22 is a unit that stores various information. The RAM 22 is also used as a temporary work memory area for the CPU 21. The ROM 23 is a unit that stores various programs and the like. For example, the CPU 21 loads the programs stored in the ROM 23 into the RAM 22 to execute the programs. Thus, the software configuration of the camera 202 as illustrated in FIGS. 10A and 10B and processing of each step in the flowchart of FIG. 11A described below are implemented.

The entire or a part of the software configuration of the camera 202 and the processing of each step in the flowchart of FIG. 11A described below can be implemented using dedicated hardware.

The communication unit 24 is a unit that connects the camera 202 to the network. The input unit 25 is a unit that inputs operation information to the CPU 21 based on a user's operation. The display unit 26 is a unit that displays the result of processing performed by the CPU 21, and the like.

FIG. 10A is a diagram illustrating an example of the software configuration of the camera 202.

The camera 202 includes, as the software configuration, an image acquisition unit 501, a human figure detection unit 502, an area number-of-people count unit 503, an area setting unit 504, and a communication unit 505.

The image acquisition unit 501 acquires an image captured by the image capturing unit 20, and converts the image into a format that enables image processing.

The human figure detection unit 502 detects the position and direction of each human figure in the acquired image.

The detection processing performed by the human figure detection unit 502 is not dependent on a specific human figure detection method. For example, the human figure detection unit 502 detects human figures by using a method of detecting a silhouette shape of an upper body, a face detection method, a method of detecting a human figure by learning other feature amounts, or the like.

The area number-of-people count unit 503 counts the number of human figures present in the determination areas. For example, the area number-of-people count unit 503 detects the number of human figures present in the determination areas 310, 320, and 330 illustrated in FIG. 3 by using a parameter or the like for detecting a human figure, and counts the number of human figures based on the detection result.

The communication unit 505 transmits the result of counting the number of human figures by the area number-of-people count unit 503 to the PC 203 via the network. The communication unit 505 receives information and the like from the PC 203 via the network.

The area setting unit 504 sets the determination areas as illustrated in FIG. 3 based on an input operation through the input unit 25 or the like, or according to setting information about an area setting received from the PC 203 through the communication unit 505. The area setting unit 504 can set a plurality of areas on the same image, or can set a plurality of areas on a plurality of images if a line of human figures cannot be set within the visual field of one camera.

FIG. 10B is a diagram illustrating an example of the software configuration of the PC 203.

The PC 203 includes, as the software configuration, a communication unit 506, a line state determination unit 507, a result output unit 508, and an area setting unit 509.

The communication unit 506 receives the result of counting the number of human figures present in the determination areas by using the camera 202 via the network. When setting information about an area setting is set in the area setting unit 509, the communication unit 506 transmits the setting information to the camera 202 via the network.

The line state determination unit 507 determines whether each of the determination areas is in the congestion state based on the result of counting the number of human figures in each determination area and the parameter set by the area setting unit 509, and determines whether the determination area to be processed is in the line state based on whether the adjacent determination area is in the congestion state.

The area setting unit 509 sets parameters for determination of the line state set via a user's operation through a graphical user interface (GUI) on the display device 140 and the input device 130. The area setting unit 509 sets setting information about the area setting set via the user's operation through the GUI on the display device 140 and the input device 130.

The result output unit 508 outputs the result of determination by the line state determination unit 507. The result output unit 508 outputs the determination result as a file to the external storage device 13, outputs the determination result on the display device 140, or transmits and outputs the determination result to another apparatus or the like.

In the present exemplary embodiment, the communication between the camera 202 and the PC 203 is not dependent on a specific communication method or protocol. For example, the protocol can be HyperText Transfer Protocol (HTTP), Real-time Transport Protocol (RTP), or Open Network Video Interface Forum (ONVIF).

Figure 11A:
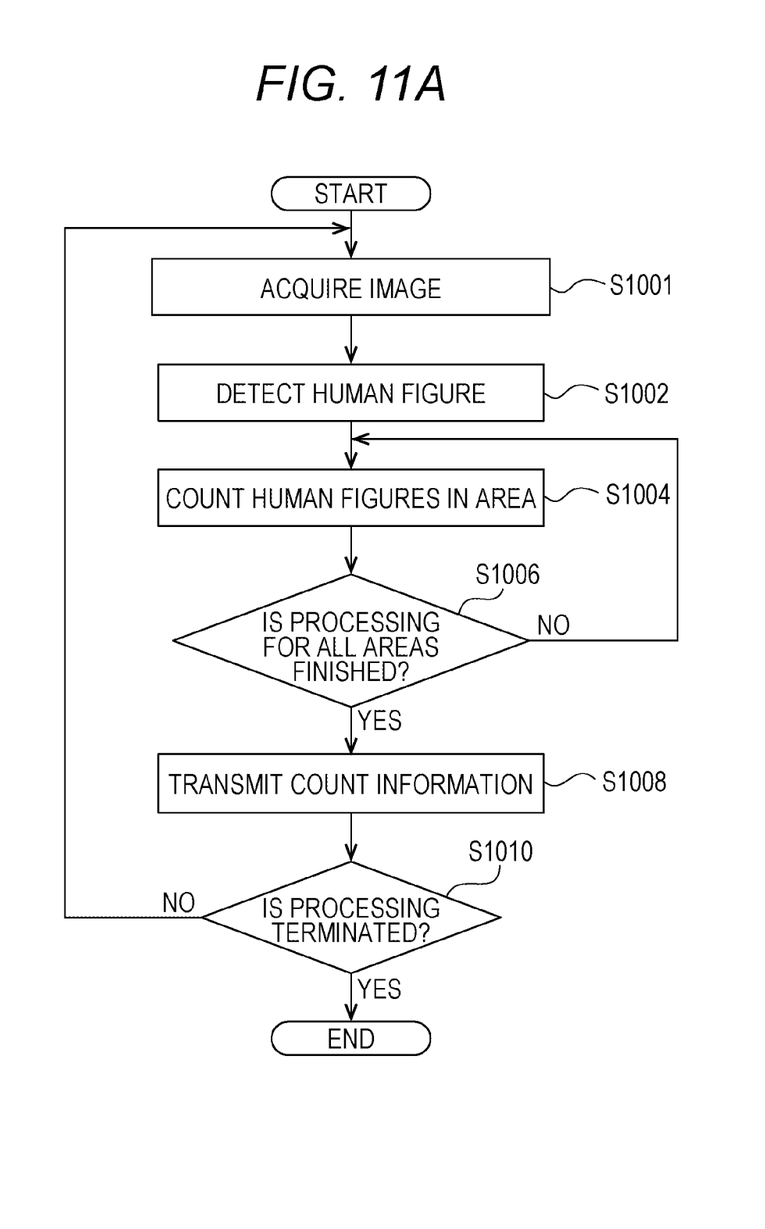
FIGS. 11A and 11B are flowcharts each illustrating an example of information processing according to the third exemplary embodiment.
Figure 11B:
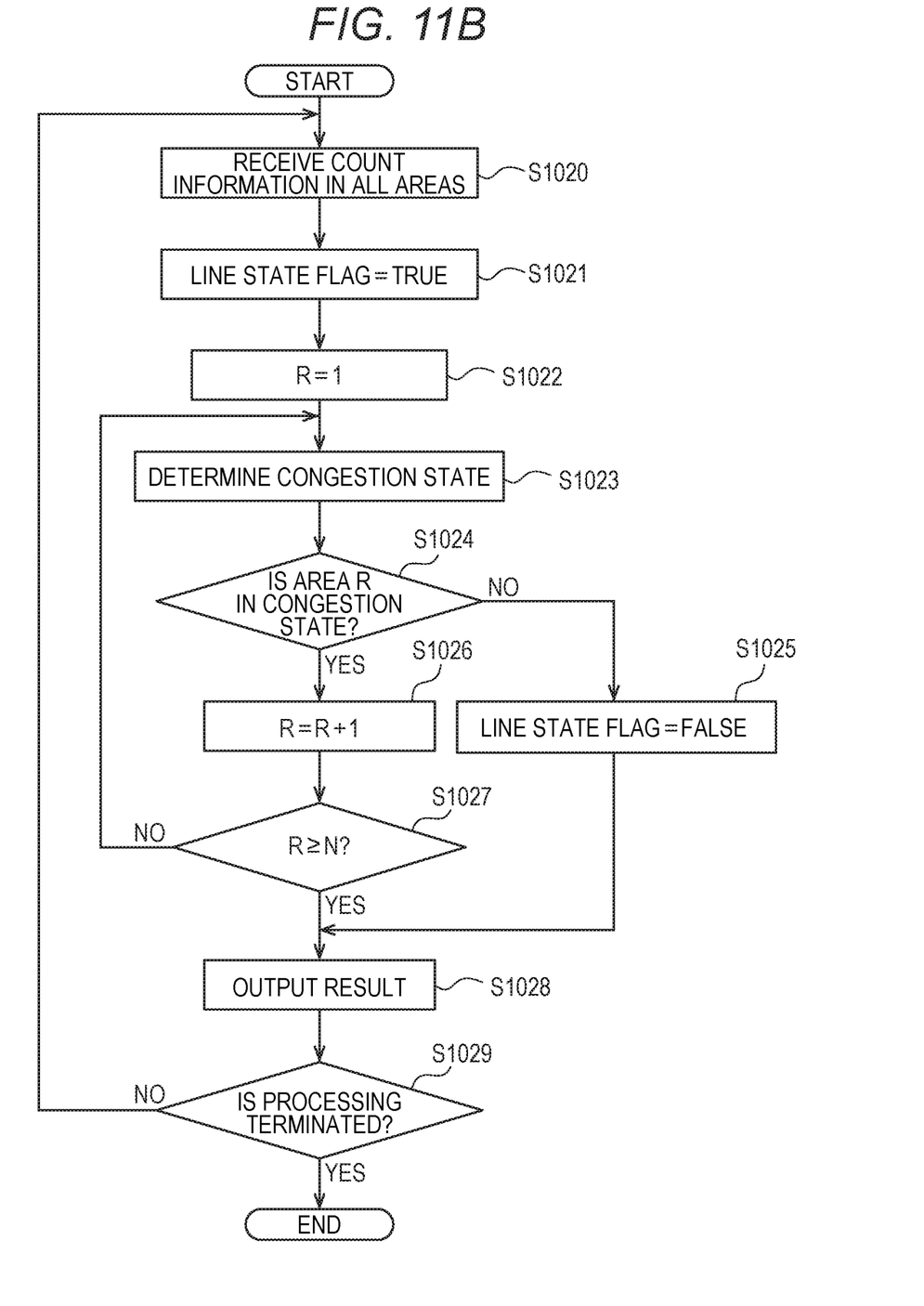

FIGS. 11A and 11B are flowcharts each illustrating an example of information processing according to the third exemplary embodiment. FIG. 11A is a flowchart illustrating an example of the information processing performed by the camera 202.

In S1001, the image acquisition unit 501 acquires an image.

In S1002, the human figure detection unit 502 detects human figures from the determination area to be processed on the acquired image.

In S1004, the area number-of-people count unit 503 counts the number of human figures detected in the determination area to be processed.

In S1006, the area number-of-people count unit 503 determines whether the processing of counting the number of human figures in all determination areas is terminated. If the area number-of-people count unit 503 determines that the processing of counting the number of human figures in all determination areas is terminated (YES in S1006), the processing proceeds to S1008. If the area number-of-people count unit 503 determines that the processing of counting the number of human figures in all determination areas is not terminated (NO in S1006), the processing returns to S1004.

In S1008, the communication unit 505 transmits the result of counting the number of human figures to the PC 203 via the network.

In S1010, the communication unit 505 determines whether the processing of the flowchart illustrated in FIG. 11A is terminated. If the communication unit 505 determines that the processing is terminated (YES in S1010), the processing of the flowchart illustrated in FIG. 11A is terminated. If the communication unit 505 determines that the processing is not terminated (NO in S1010), the processing returns to S1001.

FIG. 11B is a flowchart illustrating an example of the information processing performed by the PC 203.

In S1020, the communication unit 506 receives the result of counting the number of human figures detected in all determination areas from the camera 202 (a plurality of cameras when the information processing system includes a plurality of cameras).

In S1021, the line state determination unit 507 sets the line state flag to "true".

In S1022, the line state determination unit 507 sets the area variable R for the determination area to "1".

In S1023, the line state determination unit 507 determines whether the determination area is in the congestion state based on the counting result. For example, the CPU 10 sets a threshold for the number of human figures for each determination area in advance based on an input operation through the input device 130 or the like, and sets the threshold as a file or the like in the RAM 11, ROM 12, the external storage device 13, or the like. The line state determination unit 507 acquires, as a file or the like, the threshold for the number of human figures in the determination area to be processed. When the number of human figures detected in the determination area to be processed reaches the acquired threshold, the determination area to be processed is determined to be in the congestion state. The processing of S1023 is an example of decision processing.

In S1024, the line state determination unit 507 determines whether the area indicated by "R" is in the congestion state based on the determination result of S1023. If the line state determination unit 507 determines that the area R is not in the congestion state (NO in S1024), the processing proceeds to S1026. If the line state determination unit 507 determines that the area R is in the congestion state (YES in S1024), the processing proceeds to S1025.

In S1025, the line state determination unit 507 sets the line state flag to "false".

In S1026, the line state determination unit 507 increases (increments) the number R by 1.

In S1027, the line state determination unit 507 determines whether the determination up to the area N is completed. If the line state determination unit 507 determines that the determination up to the area N is completed (YES in S1027), the processing proceeds to S1028. If the line state determination unit 507 determines that the determination up to the area N is not completed (NO in S1027), the processing returns to S1023.

In S1028, the result output unit 508 outputs the determination result. The result output unit 508 outputs the determination result to the external storage device 13 as a file, displays and outputs the determination result on the display device 140, or transmits and outputs the determination result to another apparatus or the like.

In S1029, the result output unit 508 determines whether the processing of the flowchart illustrated in FIG. 11B is terminated. If the result output unit 508 determines that the processing is terminated (YES in S1029), the processing of the flowchart illustrated in FIG. 11B is terminated. If the result output unit 508 determines that the processing is not terminated (NO in S1029), the processing returns to S1020.

According to the present exemplary embodiment, at least one camera is used to count the number of human figures waiting in line, and the counting result is transmitted to the PC 203. The PC 203 then determines the congestion state. Thus, in the configuration that requires a plurality of cameras to observe the number of people waiting in line, the load of the PC can be reduced.

Other Exemplary Embodiments

One or more functions of the above-described exemplary embodiments can be achieved by supplying a program to a system or apparatus via a network or storage medium. The one or more functions can also be implemented by processing in which one or more processors in a computer of the system or apparatus read and execute the program. The one or more functions can still also be implemented by a circuit (e.g., an application specific integrated circuit (ASIC)).

While examples of exemplary embodiments have been described in detail above, these exemplary embodiments are not seen to be limiting.

For example, a part of or the entire software configuration of the PC 203 illustrated in FIGS. 5 and 10B can be implemented in the PC 203 as a hardware configuration. The number of each of CPUs, ROMs, RAMS, external storage devices, NICs, and the like, which are provided as the hardware configuration of the PC 203, is not limited to one. Processing can be executed by a plurality of CPUs using data or the like stored in a plurality of RAMS, ROMs, or external devices based on programs. A graphics processing unit (GPU) can be used in place of the CPU.

Part of or the entire software configuration of the camera 202 illustrated in FIG. 10A can be implemented in the camera 202 as a hardware configuration. As the hardware configuration of the camera 202, the number of CPUs, RAMS, ROMs, communication units, and the like is not limited to one. A plurality of CPUs can execute processing using data or the like stored in a plurality of RAMS or ROMs based on programs. GPUs can be used in place of the CPUs.

The above-described exemplary embodiments illustrate a case where a line of human figures is formed. Alternatively, other objects, such as vehicles or animals can be set.

According to the above-described exemplary embodiments, accurate determination of a line state is achievable.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-095759, filed May 12, 2017, and No. 2018-025099, filled Feb. 15, 2018 which are hereby incorporated by reference herein in their entirety.

What is claimed is:

1. An information processing apparatus comprising a computer executing instructions that, when executed by the computer, cause the computer to function as:
   a detection unit configured to detect an object in each of a plurality of determination areas, wherein the plurality of determination areas corresponds to an area in which a waiting line is supposed to be formed;
   a first determination unit configured to determine whether each of the plurality of determination areas is in a congestion state, based on a number of objects detected by the detection unit; and
   a second determination unit configured to determine an end position of the waiting line based on a position of a given determination area which is one of the plurality of determination areas and is not determined as the congestion state, in a case where one or more determination areas lined up from a head position of the waiting line to the position of the given determination area is determined as the congestion state.

2. The information processing apparatus according to claim 1, further comprising an acquisition unit configured to acquire an image captured by at least one camera, wherein the detection unit detects an object in each of the plurality of determination areas in the acquired image, and
   the first determination unit determines whether each of the determination areas is the congestion state based on the number of detected objects.

3. The information processing apparatus according to claim 1, further comprising a setting unit configured to set the plurality of determination areas based on a user instruction.

4. The information processing apparatus according to claim 1, wherein when the number of objects detected in the determination area reaches a set threshold, the first determination unit determines that the determination area is in the congestion state.

5. The information processing apparatus according to claim 4, wherein the first determination unit sets the threshold for each of the determination areas, based on a statistic of the number of objects detected in each of the plurality of the determination areas.

6. The information processing apparatus according to claim 1, wherein the first determination unit determines whether each of the plurality of determination areas is the congestion state based on the number of objects with a moving speed less than a certain value from among the objects in the plurality of determination areas.

7. An information processing method comprising:
   detecting an object in each of a plurality of determination areas, wherein the plurality of determination areas corresponds to an area in which a waiting line is supposed to be formed;
   firstly determining whether each of the plurality of determination areas is a congestion state, based on a number of objects detected in the detecting; and
   secondly determining an end position of the waiting line based on a position of a given determination area which is one of the plurality of determination areas and is not determined as the congestion state, in a case where one or more determination areas lined up from a head position of the waiting line to the position of the given determination area is determined as the congestion state.

8. The information processing method according to claim 7, further comprising acquiring an image captured by at least one camera, wherein
   the detecting detects an object in each of the plurality of determination areas in the acquired image, and
   the firstly determining determines whether each of the determination areas is the congestion state based on the number of detected objects.

9. The information processing method according to claim 7, further comprising setting the plurality of determination areas based on a user instruction.

10. The information processing method according to claim 7, wherein if the number of objects detected in the determination area reaches a set threshold, the firstly determining determines that the determination area is the congestion state.

11. The information processing method according to claim 10, wherein the firstly determining sets the threshold for each of the determination areas, based on a statistic of the number of objects detected in each of the plurality of the determination areas.

12. The information processing method according to claim 7, wherein the firstly determining determines whether each of the plurality of determination areas is the congestion state based on the number of objects with a moving speed less than a certain value from among the objects in the plurality of determination areas.

13. A non-transitory computer-readable storage medium storing a program for causing a computer to execute an information processing method, the information processing method comprising:
   detecting an object in each of a plurality of determination areas, wherein the plurality of determination areas corresponds to an area in which a waiting line is supposed to be formed;
   determining whether each of the plurality of determination areas is a congestion state, based on a number of objects detected in the detecting; and
   determining an end position of the waiting line based on a position of a given determination area which is one of the plurality of determination areas and is not determined as the congestion state, in a case where one or more determination areas lined up from a head position of the waiting line to the position of the given determination area is determined as the congestion state.

* * * * *